(12) United States Patent
Hong

(10) Patent No.: US 11,874,925 B2
(45) Date of Patent: Jan. 16, 2024

(54) DATA PROCESSING METHOD FOR COPING WITH RANSOMWARE, PROGRAM FOR EXECUTING THE METHOD, AND COMPUTER-READABLE RECORDING MEDIUM STORING THE PROGRAM

(71) Applicant: SECUVE CO., LTD., Seoul (KR)

(72) Inventor: Ki Yoong Hong, Seoul (KR)

(73) Assignee: SECUVE CO., LTD., Seoul (KR)

( * ) Notice: Subject to any disclaimer, the term of this patent is extended or adjusted under 35 U.S.C. 154(b) by 0 days.

(21) Appl. No.: 17/934,840

(22) Filed: Sep. 23, 2022

(65) Prior Publication Data

US 2023/0017807 A1 Jan. 19, 2023

Related U.S. Application Data

(62) Division of application No. 16/345,212, filed as application No. PCT/KR2019/001137 on Jan. 28, 2019, now Pat. No. 11,562,072.

(30) Foreign Application Priority Data

Mar. 16, 2018 (KR) ........................ 10-2018-0030780

(51) Int. Cl.
*H04L 29/06* (2006.01)
*G06F 21/56* (2013.01)
*G06F 21/55* (2013.01)

(52) U.S. Cl.
CPC .......... *G06F 21/568* (2013.01); *G06F 21/554* (2013.01); *G06F 21/566* (2013.01)

(58) Field of Classification Search
CPC ..... G06F 21/568; G06F 21/554; G06F 21/566
See application file for complete search history.

(56) References Cited

U.S. PATENT DOCUMENTS

2008/0184367 A1\* 7/2008 McMillan ............. G06F 21/563
726/23
2017/0228542 A1 8/2017 Langton et al.
(Continued)

FOREIGN PATENT DOCUMENTS

KR 10-2017-0127630 A 11/2017
KR 10-2018-0001878 A 1/2018
KR 10-2018-0001941 A 1/2018

OTHER PUBLICATIONS

International Search Report of PCT Application No. PCT/KR2019/001137—5 pages (dated May 8, 2019).

*Primary Examiner* — Evans Desrosiers
(74) *Attorney, Agent, or Firm* — Studebaker & Brackett PC

(57) ABSTRACT

The present disclosure provides a data processing method for coping with ransomware, which encrypts data with a malicious intent and blocks an access to the data, to protect the data, and a program for executing the data processing method. In a computer apparatus that loads an application program stored in a memory onto a processor and carries out a predetermined processing according to the application program, on an operating system (OS) kernel which controls an access of the application program to hardware components of the computer apparatus, the processor reads the data stored in the memory, performs the predetermined processing at the request of the application program, determines whether a ransomware attack occurred for the data before storing the processed data back to the memory, and stores the processed data to the memory according to a determination result, thereby preventing the damage caused by the ransomware attack.

5 Claims, 6 Drawing Sheets

(56) References Cited

U.S. PATENT DOCUMENTS

| | | |
|---|---|---|
| 2018/0048658 A1 | 2/2018 | Hittel et al. |
| 2018/0075234 A1* | 3/2018 | Boutnaru .............. G06F 21/554 |
| 2018/0307839 A1* | 10/2018 | Bhave ................... G06F 21/566 |
| 2019/0130097 A1* | 5/2019 | Berler ................... G06F 21/552 |

* cited by examiner

DATA PROCESSING METHOD FOR COPING WITH RANSOMWARE, PROGRAM FOR EXECUTING THE METHOD, AND COMPUTER-READABLE RECORDING MEDIUM STORING THE PROGRAM

CROSS-REFERENCE TO RELATED APPLICATIONS

This application is a divisional of U.S. patent application Ser. No. 16/345,212, filed on Apr. 25, 2019, which is a national phase of PCT Application No. PCT/KR2019/001137, filed on Jan. 28, 2019, which claims priority to Korean Patent Application No. 10-2018-0030780 filed on Mar. 16, 2018, each of which is hereby incorporated by reference.

BACKGROUND

Technical Field

The present disclosure relates to a data processing method for coping with ransomware which encrypts data for malicious purposes to make the data inaccessible and for protecting data from the ransomware. Also, the present disclosure relates to a program for executing the data processing method and a computer-readable recording medium on which the program is recorded.

Description of Related Technology

The description in this section merely provides background information of embodiments of the present disclosure and is not intended to specify prior arts of the present disclosure.

The development of information and communication technologies bring about a rapid increase in the use of information devices, along with relevant services, which operates based on wired or wireless communications such as smartphones, tablet PCs, and laptops. The increased use of the information devices, in turn, has caused a sharp increase in damages due to various malicious codes that harm users and are based on vulnerabilities of the user devices, networks, or service procedures.

Among the various malicious codes, ransomware is malicious software that infects a computer system and blocks an access of a user to the computer systems to demand the user of the system for a ransom. Since the computer infected with the ransomware is inaccessible, the victim is forced to pay the ransom to those having distributed the malicious codes to recover their access to the computer. While some of the ransomware encrypts the victim's files to make them inaccessible, another ransomware simply locks the system and prompts a ransom payment message to the computer user.

Though the ransomware was initially designed to encrypt the victim's files with an algorithm that can be decrypted, a transition is being made to unidirectional encryption that prevents the decryption of the encrypted data as a development of a recovery and restoration solution.

In addition, the ransomware may be distributed through various paths such as e-mail, a web site, a P2P site, and infection targets are not limited to a PC but are expanding to data stored in an external hard disk drive (HDD) connected to the PC, a server connected to a network drive, a cloud storage, and a smartphone. In particular, recently, the user computer may be infected by a drive-by download technique which infects the computer by a simple visiting of a web site with no clicking on anything or pressing a download button. According to the drive-by download, an attacker may conceal the malicious codes by use of security vulnerabilities of the web site, for example, so that the user may download the malicious codes without the user knowing it.

Therefore, it is difficult to adequately cope with evolving ransomware attacks by simply minimizing the infection of malicious codes or restoring the encrypted data.

In particular, as the rapid increase of the use of the digital devices and important user data such as electronic money, a measure for preventing the data from being encrypted with malicious intent by the ransomware is required.

SUMMARY

An object of the present disclosure is to provide a data processing method for coping with ransomware to prevent data encrypted by the ransomware from being stored in a memory and protect the data when the data is infected by the ransomware and inaccessible because of an encryption of the data under a malicious intent. Also, the present disclosure provides a program for executing the data processing method and a computer readable recording medium on which the program is recorded.

In particular, the present disclosure provides a data processing method that is performed in a computer apparatus that loads an application program stored in a memory onto a processor and carries out a predetermined processing according to the application program. On a level of an operating system (OS) kernel which controls an access of the application program to hardware components of the computer apparatus, the processor reads the data stored in the memory, performs the predetermined processing at the request of the application program, determines whether a ransomware attack occurred for the data before storing the processed data back to the memory, and, according to a determination result, stores the processed data to the memory, thereby preventing the damage caused by the ransomware attack.

According to an aspect of an exemplary embodiment, a data processing method for coping with ransomware in a computer apparatus having a processor and a memory, includes: setting a threshold as a criterion for determining randomness, by the processor, for each of at least one characteristic value representing characteristics of data; when output subject data to be outputted from the processor to the memory is generated, extracting the at least one characteristic value for the output subject data; determining randomness of the output subject data by comparing at least one extracted characteristic value with the corresponding threshold; determining whether a ransomware attack occurred to the output subject data according to a randomness determination result; and executing an output operation of the output subject data according to ransomware attack determination result.

The output subject data may be processed in a file unit or a kernel buffer unit.

The operation of extracting the at least one characteristic value for the output subject data may include: extracting at least one of a bit position ratio characteristic value, a segment bit number ratio characteristic value, and a segment pattern frequency characteristic value from the output subject data.

The operation of determining the randomness of the output subject data may include: determining that each of the at least one characteristic value has the randomness if a randomness matching ratio of the characteristic value is greater than a corresponding threshold.

The operation of determining the whether the ransomware attack occurred may include: determining that the ransomware attack occurred to the output subject data in case that it is determined that more than a predetermined number of characteristic values have the randomness.

According to an aspect of another exemplary embodiment, a data processing method for coping with ransomware in a computer apparatus having a processor and a memory, includes: registering at least one characteristic value selected in consideration of a type of data; when output subject data to be outputted from the processor to the memory is generated, extracting the at least one characteristic value for the output subject data; analyzing a matching level of each of the at least one characteristic value by comparing the at least one characteristic value extracted from the output subject data with a corresponding registered characteristic value; determining whether an ransomware attack occurred to the output subject data according to a matching level analysis result; and executing an output operation of the output subject data according to a ransomware attack determination result.

The operation of registering the at least one characteristic value may include: registering at least one of: a bit position ratio characteristic value for each type extracted from data categorized by data types and a maximum and minimum range thereof, a segment bit number ratio characteristic value for each type extracted from the data categorized by data types and a maximum and minimum range thereof, a segment pattern frequency characteristic value for each type extracted from the data categorized by data types and a maximum and minimum range thereof, a bit position ratio characteristic value for all types extracted from all types of data regardless of the data types and a maximum and minimum range thereof, a segment bit number ratio characteristic value for all types extracted from all the types of data regardless of the data types and a maximum and minimum range thereof, and a segment pattern frequency characteristic value for all types extracted from all the types of data regardless of the data types and a maximum and minimum range thereof.

The operation of extracting the at least one characteristic value for the output subject data may include: extracting at least one of a bit position ratio characteristic value, a segment bit number ratio characteristic value, and a segment pattern frequency characteristic value from the output subject data. The operation of analyzing the matching level comprises at least one of: verifying whether the bit position ratio characteristic value extracted from the output subject data matches the bit position ratio characteristic value for a type corresponding to the output subject data among the registered characteristic values; verifying whether the segment bit number ratio characteristic value extracted from the output subject data matches the segment bit number ratio characteristic value for the type corresponding to the output subject data among the registered characteristic values; verifying whether the segment pattern frequency characteristic value extracted from the output subject data matches the segment pattern frequency characteristic value for the type corresponding to the output subject data among the registered characteristic values; verifying whether the bit position ratio characteristic value extracted from the output subject data is within the maximum and minimum range of the bit position ratio characteristic value for the type corresponding to the output subject data among the registered characteristic values; verifying whether the segment bit number ratio characteristic value extracted from the output subject data is within the maximum and minimum range of the segment bit number ratio characteristic value for the type corresponding to the output subject data among the registered characteristic values; verifying whether the segment pattern frequency characteristic value extracted from the output subject data is within the maximum and minimum range of the segment pattern frequency characteristic value for the type corresponding to the output subject data among the registered characteristic values; verifying whether the bit position ratio characteristic value extracted from the output subject data matches the bit position ratio characteristic value for all types among the registered characteristic values; verifying whether the segment bit number ratio characteristic value extracted from the output subject data matches the segment bit number ratio characteristic value for all types among the registered characteristic values; verifying whether the segment pattern frequency characteristic value extracted from the output subject data matches the segment pattern frequency characteristic value for all types among the registered characteristic values; verifying whether the bit position ratio characteristic value extracted from the output subject data is within the maximum and minimum range of the bit position ratio characteristic value for all types among the registered characteristic values; verifying whether the segment bit number ratio characteristic value extracted from the output subject data is within the maximum and minimum range of the segment bit number ratio characteristic value for all types among the registered characteristic values; and verifying whether the segment pattern frequency characteristic value extracted from the output subject data is within the maximum and minimum range of the segment pattern frequency characteristic value for all types among the registered characteristic values.

The operation of registering the at least one characteristic values may include: setting a threshold for each of the registered characteristic values. The operation of analyzing the matching level may include: analyzing whether a matching ratio between the at least one of the characteristic value extracted from the output subject data and the registered characteristic value corresponding to the extracted characteristic values is greater than or equal to a corresponding threshold.

The operation of determining whether the ransomware attack occurred may include: determining that the ransomware attack occurred to the output subject data in case that the number of verification operations, among a plurality of verification operations, that are not satisfied is greater than or equal to a predetermined number.

The data processing method for coping with the ransomware described above may be implemented by a computer program stored in a non-transitory computer-readable storage medium.

The method of the present disclosure is applicable in a computer apparatus that loads an application program stored in a memory onto a processor and carries out a predetermined processing according to the application program. On a level of an operating system (OS) kernel which controls an access of the application program to hardware components of the computer apparatus, the processor reads the data stored in the memory, performs the predetermined processing at the request of the application program, determines whether a ransomware attack occurred for the data before storing the processed data back to the memory, and, according to a determination result, stores the processed data to the memory. Thus, the present disclosure may prevent the damage caused by the ransomware attack.

In other words, the present disclosure prevents the data infected by the ransomware from being stored into the memory and protects the data by determining whether a ransomware attack occurred on the data processed by the processor according to a request of an application program before the processed data is stored back into the memory.

Particularly, according to the present disclosure, the output subject data to be stored back into the memory is divided into a plurality of segments each having a predetermined size, and characteristic values such as a bit position ratio and a pattern appearing in the data are extracted. The ransomware attack is detected based on the randomness existing in the output subject data after the ransomware attack, or by a matching level analysis which compares characteristic values extracted from the data for each data type with registered characteristic values. As a result, the present disclosure can filter out ransomware attacks that have not been detected in advance.

DETAILED DESCRIPTION

Figure 1:
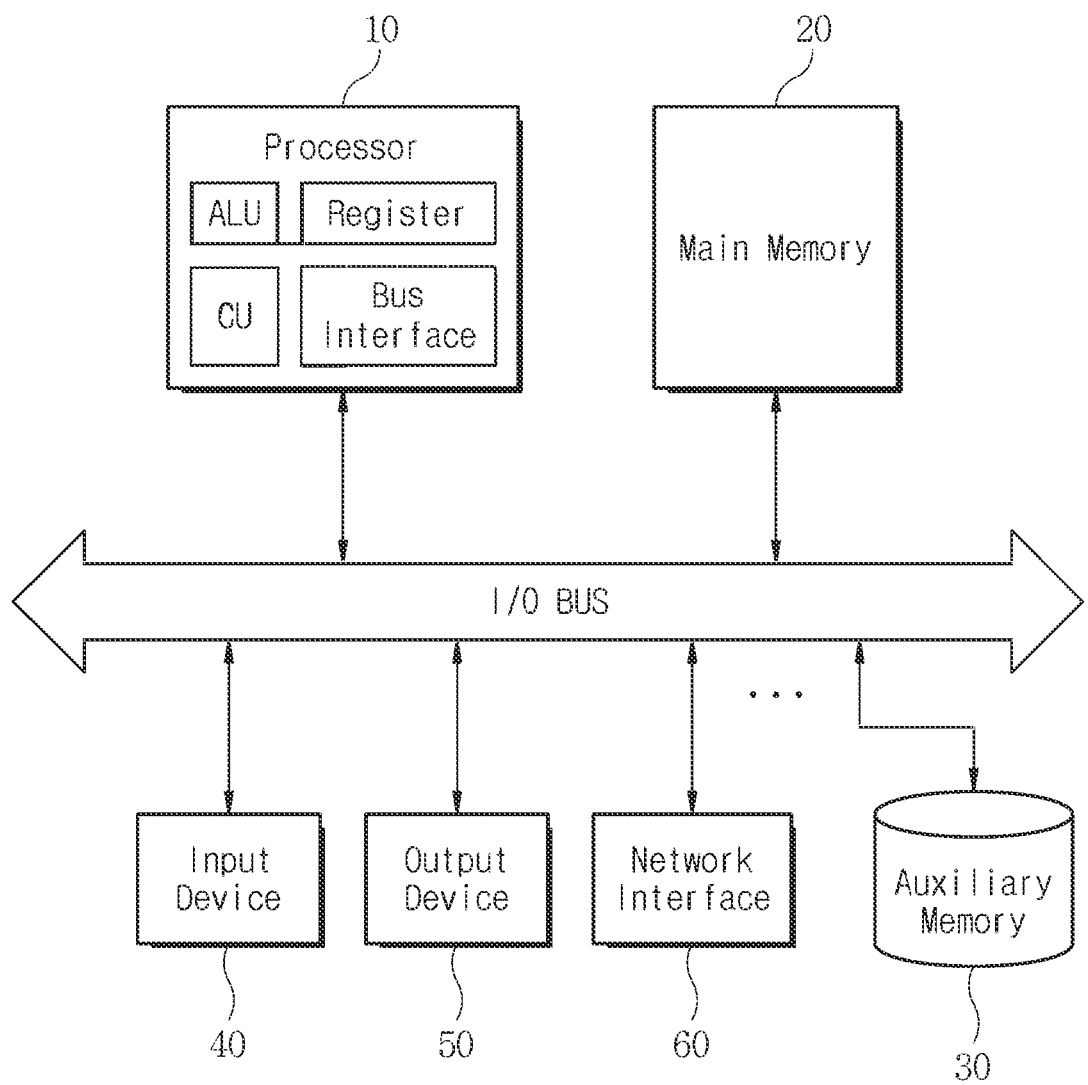
FIG. 1 is a schematic block diagram of a computer apparatus to which a data processing method for coping with ransomware according to an embodiment of the present disclosure is applied.

For a more clear understanding of the features and advantages of the present disclosure, the present disclosure will be described in detail with reference to the accompanied drawings.

In the following description and the accompanied drawings, detailed descriptions of well-known functions or configuration that may obscure the subject matter of the present disclosure will be omitted for simplicity.

It is to be noted that the same components are designated by the same reference numerals throughout the drawings.

The terms and words used in the following description and drawings are not necessarily to be construed in an ordinary sense or a dictionary, and may be appropriately defined herein to be used as terms for describing the present disclosure in the best way possible. Such terms and words should be construed as meaning and concept consistent with the technical idea of the present disclosure.

It should be noted that the embodiments of the present disclosure described in the present specification and drawings are only illustrative of the present disclosure and are not intended to limit the scope of the present disclosure. It will be apparent to those skilled in the art that other modifications may be made based on the technical idea of the present disclosure in addition to the embodiments disclosed herein.

The terminologies including ordinals such as "first" and "second" used to explain various elements in this specification may be used to distinguish an element from the other ones, but the terms do not restrict the structures of the elements. For example, a second component may be referred to as a first component, and similarly, a first component may also be referred to as a second component without departing from the scope of the present disclosure.

When an element is referred to as being "connected" or "coupled" to another element, it means that it is logically or physically connected or it may be connected to the other element. In other words, it is to be understood that although an element may be directly connected or coupled to another element, there may be other elements therebetween, or element may be indirectly connected or coupled to the other element.

The terminologies used herein are only illustrative of the exemplary embodiments and are not intended to limit the scope of the present disclosure.

The singular forms include plural referents unless the context clearly dictates otherwise.

Also, the expressions "~comprises," "~includes," "~constructed," "~configured" are not to be construed as being equipped with all the components, processing steps, or operations described in this specification, but some of the components, the processing steps, or the operations may not be included and additional elements may be incorporated further.

A data processing method for coping with ransomware according to the present disclosure may be described in connection with computer-executable instructions such as program modules that may be executed by a computer system. Generally, the program modules may include routines, programs, objects, components, data structures, and so on suitable for performing particular tasks or implementing particular abstract data types. The computer-executable instructions, associated data structures, and program modules exemplify the program code means for carrying out processes described herein.

The computer-executable instructions may include instructions and data that may cause a general purpose computer system or a special purpose computer system, for example, to perform a particular function or a group of functions. The computer executable instructions may be written in an assembly language or even in binary and intermediate format instructions, such as a source code.

The data processing method for coping with ransomware according to the present disclosure may be implemented by a computer-readable recording medium having or carrying computer-executable instructions or a data structure stored therein.

Such a computer-readable medium may be an arbitrary medium that is accessible by a general purpose or special purpose computer system. The computer-readable medium may include, but is not limited to, a physical storage unit media such as RAM, ROM, EPROM, CD-ROM, other optical disk storage unit, a magnetic disk storage unit, and other magnetic storage unit devices. The computer-readable media may be used to store or deliver certain program code means in the form of computer-executable instructions, computer-readable instructions, or data structures.

The computer apparatus suitable for applying the present disclosure may be one of various terminals such as a personal computer (PC), a laptop computer, a handheld device, a multiprocessor system, a microprocessor-based or programmable consumer electronics, a network PC, a mini computer, a main frame computer, a smartphone, a tablet PC, and a personal digital assistant (PDA). Prior to description of the present disclosure, the configuration and operation of the computer apparatus to which the present disclosure is applied will be described briefly.

Figure 2:
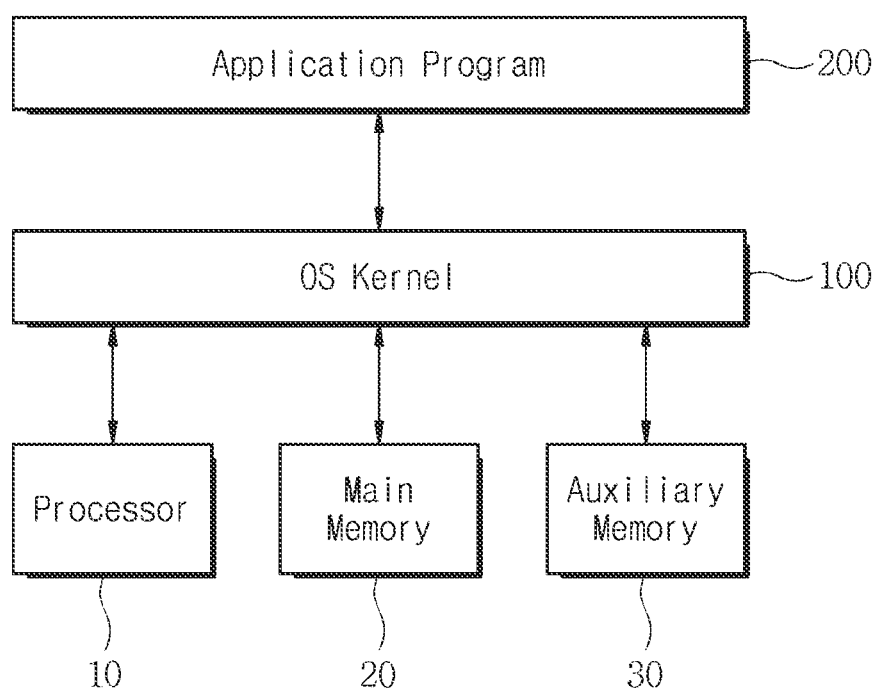
FIG. 2 is a block diagram illustrating a hierarchical structure of a computer apparatus to which the present disclosure is applied.

FIG. 1 is a schematic block diagram of a computer apparatus suitable for applying a data processing method for coping with ransomware according to an embodiment of the present disclosure, and FIG. 2 is a block diagram illustrating a hierarchical structure of the computer apparatus.

Referring to FIG. 1, the computer apparatus includes a processor 10, a main memory 20, and an auxiliary memory 30 connected by an input/output (I/O) bus. The computer apparatus may be coupled to various peripheral devices such as an input device 40, an output device 50, and a network interface 60. Here, the I/O bus may be a local bus, a peripheral bus, a memory bus, and any of several types of bus structures involving a memory controller.

The processor 10 may be a central processing unit (CPU) or a microprocessor which executes computer-executable instructions designed to implement the features of the present disclosure. The CPU, which interprets and executes computer program instructions written in a machine language, fetches information from an external device (e.g., the main memory 20 or the auxiliary memory 30) according to the program, stores internally and operates the information, and outputs an operation result externally. Also, the CPU controls operations of the computer apparatus while exchanging information with other components of the computer apparatus. The microprocessor refers to a device in which the function of the CPU is integrated into one or several integrated circuits.

The processor 10 includes a register for storing instructions to be processed, an arithmetic and logic unit (ALU) for performing comparisons, determination, and arithmetic operations, a control unit (CU) for internally controlling the processor to interpret and properly execute the instructions, and a bus interface. The processor 10 fetches and decodes the instructions to be executed from the memory, extracts information of an operation and data included in the instructions, and executes the operations according to the extracted operation and data. In case that an operation result is to be used as an input data for a next instruction, the operation result is temporarily stored in the register. However, if the operation result is not immediately used in the next instruction, the operation result is stored in the memory.

The processor 10 sequentially processes a set of instructions of the program module, as described above, to perform a predetermined function of the program module.

The main memory 20 temporarily stores data used immediately by the processor 10, and it may be referred to as a system memory, a computer memory, or a primary memory.

The auxiliary memory 30 temporarily or permanently stores data processed in the computer apparatus, and may be referred to as a secondary storage or an auxiliary storage. While the main memory 20 is implemented by a read only memory (ROM) and/or a random access memory (RAM), the auxiliary memory 30 is implemented by a flash memory and/or a magnetic disk such as a hard disk. The auxiliary memory 30 stores an operating system (OS) program, application programs, and other program modules installed in the computer apparatus, and the main memory 20 temporarily stores data stored in the auxiliary memory 30 while the data is being processed by the processor 10 under the control of the processor 10.

The ROM may store a basic input/output system (BIOS) containing basic routines of initializing hardware components during a booting procedure, reading the operating system stored in the boot loader or a mass storage device into the RAM, and transferring information between components within the computing apparatus.

The computer apparatus may further include various storage devices in addition to the hard disk as the auxiliary memory 30. For example, the computer apparatus may further include an optical disk such as a CD-ROM or other optical medium for reading out information stored therein or recording information thereto. A hard disk drive, a magnetic disk drive, and an optical disk drive may be connected to the I/O bus through a hard disk drive interface, a magnetic disk drive interface, and an optical drive interface, respectively.

In addition, the computer apparatus can receive commands and information from a user through the input device 40 such as a keyboard, a pointing device, a microphone, a joystick, a game pad, a scanner, and the like.

These input devices 40 may be coupled to the processor 10 via an I/O interface connected to the I/O bus.

The I/O interface may logically include any of a wide variety of different interfaces such as a serial port interface, a PS/2 interface, a parallel port interface, a USB interface, an IEEE1394 interface (i.e. FireWire interface) or a combination of the interfaces.

The computer apparatus suitable for implementing the present disclosure may further include an output device 50 such as a display device (e.g., a monitor and/or an LCD) and an audio device (e.g., a speaker and/or a microphone) which may be connected to the I/O bus through a video/audio interface. The video/audio interface may include a high definition multimedia interface (HDMI), a graphics device interface (GDI), or the like.

The computer apparatus suitable for implementing the present disclosure can send and receive data to and from an external device by accessing a network such as an office-wide or enterprise-wide computer network, a home network, an intranet, and/or the Internet. For example, the computer apparatus may exchange data with external sources such as a remote computer system, a remote application, and/or a remote database.

To this end, the computer apparatus suitable for implementing the present disclosure further includes a network interface 60 that receives data from the external source and/or transmits data to the external source.

The network interface 60 may be implemented by a logical combination of one or more software and/or a hardware module. For example, the network interface 60 may be implemented by a network interface card and a corresponding Network Driver Interface Specification (NDIS) stack.

Although not shown in the drawing, the computer apparatus 10 may be connected to a modem such as a standard modem, a cable modem, and a digital subscriber line (DSL) modem through the network interface to receive data from the external source and/or transmit data to the external source.

The computer apparatus configured as described above, when powered, loads the OS program stored in the auxiliary memory 30 into the main memory 20 and executes the OS program to establish an OS environment on which various application programs may be executed.

On the OS environment, the computer apparatus can load one or more application programs stored in the auxiliary memory 30 into the main memory 20 according to a user request or preset settings and execute the application programs so that desired functions provided by the application programs are performed.

As shown in FIG. 2, the computer apparatus has an hierarchical structure that one or more application programs 200 executable in the computer apparatus are connected to the hardware components such as the processor 10, the main memory 100, and the auxiliary memory 30 through an OS kernel 100 implemented by executing the OS program.

The OS kernel 100 connects one or more application programs 200 to the hardware components of the computer apparatus such as the processor 10, the main memory 20, the auxiliary memory 30, the input device 40, the output device 50, and the network interface 60 and performs functions such as security, resource management, and hardware abstraction.

When a malicious code such as ransomware with which the present disclosure is concerned is installed and executed in the computer apparatus, the ransomware encrypts arbitrary data stored in the auxiliary memory 30. In detail, according to instructions of ransomware, the processor 10 reads the arbitrary data stored in the auxiliary memory 30 into the main memory 20, encrypts the data loaded into the main memory 20, and then stores the encrypted data into the auxiliary memory 30.

The present disclosure analyzes the characteristics of the data and determines whether a ransomware attack has occurred before storing the data processed by the processor 10 back into the auxiliary memory 30. Such an operation may be accomplished in the OS kernel 100.

That is, according to the data processing method for coping with the ransomware according to the present disclosure, which is implemented by a program module executable on the OS kernel 100, the OS kernel 100 analyzes the characteristics of the data processed and output by the processor 10 before the data is stored in the auxiliary memory 30 and stores the data in the auxiliary memory 30 only when the ransomware attack has not occurred while cancelling the output of the data in the case that the ransomware attack has occurred.

Before describing the present disclosure in detail with reference to the drawings, the functions and parameters required for calculating and defining the characteristic values of data are defined below together with terms used herein.

First, the data for which the present disclosure is applied may include, for example, a source code file written in a programming language, an object code file, an executable code file for all programs including a word processing program, instruction codes, an OS program, a system program, a utility program, and an application program. Also, the data may be a data file such as a text file, a document file, a graphic image file, a multimedia file, and a hypertext file.

With regard to the present disclosure, the data may be processed in a unit of a file or a kernel buffer. The kernel buffer refers to an area managed by the OS kernel 100 shown in FIG. 2 for storing data requested to be output from the processor 10 and written in the auxiliary memory 30. For example, a certain area in the main memory 20 may be allocated and used for the kernel buffer.

For reference, the size of data processed in the file unit may be represented by the number of bytes of the file and may be denoted by 'FileSize'. The size of data processed in the kernel buffer unit may be represented by the number of bytes of the kernel buffer and may be denoted by 'BufSize'.

In order to extract the characteristic values of data processed in the file unit or the kernel buffer unit of the present invention, the data may be divided into segments of a predetermined size. The size of the segment may be represented by (N, n). Here, 'N' denotes the number of bytes constituting the segment, and 'n' denotes the number of bits constituting the segment. Accordingly, the numbers have a relationship of n=N*8. Hereinbelow, a number of segments is denoted by 'k'. Thus, the number of data segments processed in the file unit will be $$k = \text{FileSize} \times \frac{1}{N},$$

and the number of data segments processed in the kernel buffer unit will be $$k = \text{BuffSize} \times \frac{1}{N}.$$

Meanwhile, each segment in the data processed in the file unit or the kernel buffer unit is denoted by $\text{BUF}_i$, where i=0, 1, ..., (k−1).

To calculate the characteristic values of the data according to the present invention, defined is a function $\text{bit}(\text{BUF}_i, j)$ which indicates the value of j-th bit in the i-th segment $\text{BUF}_i$ and has a value of "0" or "1." For example, the number of bits set to "1" in any segment can be obtained by summing the return values of the function $\text{bit}(\text{BUF}_i, j)$ for the segment. Hereinafter, the number of bits set to "1" in the segment $\text{BUF}_i$ is denoted by $\in_i$. Therefore, the number of bits set to "1" in the segment ($\text{BUF}_i$) ranges from "0" to "n" (i.e., $0 \leq \in_i \leq n$). Also, the segment ($\text{BUF}_i$) may have any of a maximum of 2n patterns from a pattern in which all bits are set "0" to a pattern in which all bits are set "1". The segment pattern representing a pattern in which bit values are arranged in each segment as described above is denoted by $\Delta_a$ hereinafter.

The method of processing data for coping with ransomware according to the present disclosure will be described in more detail with reference to FIGS. 3-6.

In the descriptions below, provided are a first and second embodiments of the present disclosure which differ from each other in a method of determining whether the ransomware attack has occurred or not. In the first embodiment, the occurrence of the ransomware attack is determined according to a randomness of output subject data based on the characteristic values of the output subject data to be outputted. Contrarily, in the second embodiment, the occurrence of the ransomware attack is determined by calculating and registering a reference characteristic value for each data type and then analyzing a matching ratio between the characteristic value of the output subject data and the corresponding registered characteristic value.

Figure 3:
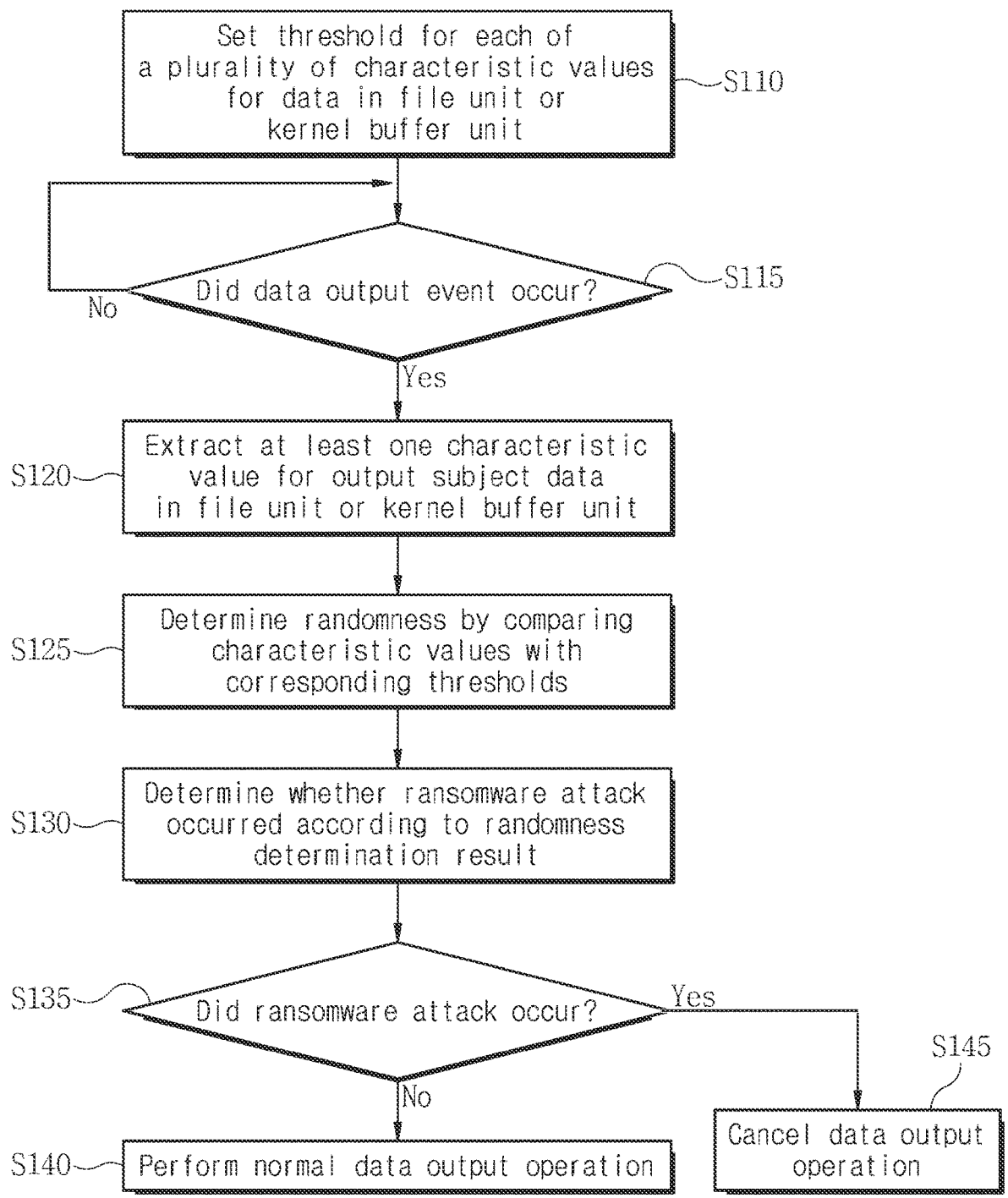
FIG. 3 is a flowchart illustrating a data processing method for coping with ransomware according to a first embodiment of the present disclosure.

The data processing method for coping with ransomware according to the first embodiment will be described with reference to FIG. 3, which is a flowchart illustrating the data processing method for coping with ransomware according to the first embodiment of the present disclosure.

According to the first embodiment of the present disclosure, as a reference for determining the occurrence of the ransomware attack, a threshold which is a criterion for determining the randomness of each characteristic value is set for at least one of the characteristic values representing the characteristics of the data (S110). Here, the at least one of the characteristic values represents a characteristics of digital data composed of a plurality of data bits, each being expressed by a binary value of "0" or "1". Each of the characteristic values may be expressed by a pattern or the number of bit values. The threshold set in the operation S110 as a criterion for determining the randomness of each characteristic value represents a threshold for the matching ratio of randomness of each characteristic value.

When an event of outputting data from the processor 10 to the auxiliary memory 3 occurs (S115), at least one characteristic value is extracted for the output subject data (S120).

Figure 4:
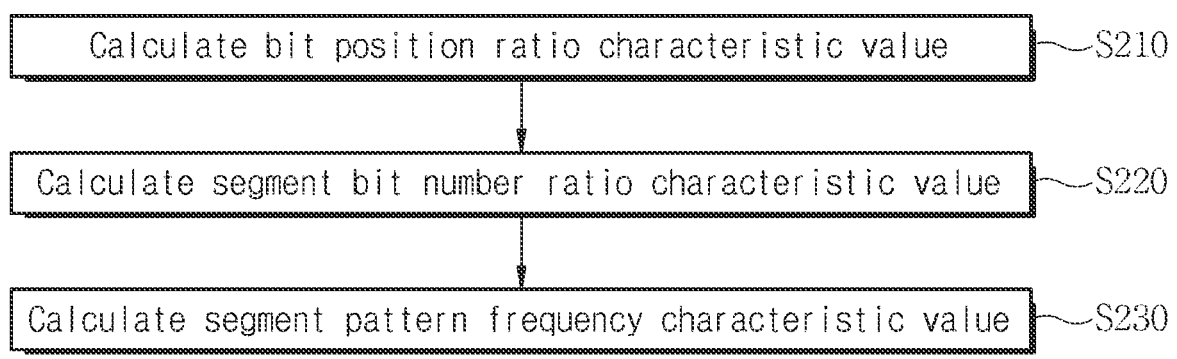
FIG. 4 is a flowchart illustrating a process of extracting data characteristic values in the data processing method for coping with ransomware according to the first embodiment of the present disclosure.

In the first embodiment of the present disclosure, the at least one characteristic value may be calculated as shown in FIG. 4 to include at least one of a bit position ratio characteristic value, a segment bit number ratio characteristic value, and a segment pattern frequency characteristic value.

The bit position ratio characteristic value may be calculated by equation 1 (S210).

$$P_j = \frac{B_j}{k} \qquad \text{[Equation 1]}$$

Here, '$P_j$' denotes the bit position ratio characteristic value, where j=0, 1, . . . (n−1). 'k' denotes the number of segments in the data and has the value of $$k = \text{FileSize} \times \frac{1}{N}$$

in case of the data processed in the file unit while having the value of $$k = \text{BufSize} \times \frac{1}{N}$$

in case of the data processed in the kernel buffer unit.

'$B_j$' denotes a bit position characteristic value which indicates the number of bits set to "1" at a j-th bit position in all segments of the data, and is defined by equation 2.

$$B_j = \sum_{i=0}^{k-1} \text{bit}(BUF_i, j) \qquad \text{[Equation 2]}$$

Accordingly, the bit position ratio characteristic value ($P_j$) means a ratio at which a bit set to "1" may appear at the j-th bit position in all segments of the data.

Meanwhile, the segment bit number ratio characteristic value indicates a ratio at which a bit set to "1" may appear in all bit positions of each segment of the data, and is calculated as follows (S220).

The number of bits set to "1" ($\epsilon_i$) in the i-th segment ($BUF_i$) can be defined by equation 3.

$$\epsilon_i = \sum_{i=0}^{n-1} \text{bit}(BUF_i, j) \qquad \text{[Equation 3]}$$

Here, i=0, 1, . . . , (k−1). As mentioned above, 'k' denotes the number of segments and has the value of $$k = \text{FileSize} \times \frac{1}{N}$$

in case of the data processed in the file unit while having the value of $$k = \text{BuffSize} \times \frac{1}{N}$$

in case of the data processed in the kernel buffer unit.

The number of bits set to "1" ($\epsilon_i$) in the i-th segment ($BUF_i$) is equal to or greater than zero and equal to or smaller than the number of bits (n) constituting the segment.

A sum of segment bit numbers $C_i$ is calculated by applying the number of bits set to "1" ($\epsilon_i$) in the segment ($BUF_i$) calculated by the equation 3 to equation 4 below.

$$\begin{aligned} &\text{initially } \forall j, C_j \leftarrow 0, \\ &\forall i, \\ &x \leftarrow \epsilon_i \\ &C_x \leftarrow C_x + 1 \end{aligned} \qquad \text{[Equation 4]}$$

Here, i=0, 1, . . . , (k−1), j=0, 1, . . . , n, x=0, 1, . . . , n, and $\epsilon_i$=0, 1, . . . , n. As mentioned above, 'k' denotes the number of segments and has the value of $$k = \text{FileSize} \times \frac{1}{N}$$

in case of the data processed in the file unit while having the value of $$k = \text{BuffSize} \times \frac{1}{N}$$

in case of the data processed in the kernel buffer unit.

Then, the segment bit number ratio characteristic value is calculated by dividing the sum of segment bit numbers ($C_j$) calculated for the data by the number of segments as shown in equation 5.

$$\rho_j = \frac{C_j}{k} \qquad \text{[Equation 5]}$$

Here, '$\rho_j$' denotes the bit number ratio characteristic value. 'k' denotes the number of segments in the data and has the value of $$k = \text{FileSize} \times \frac{1}{N}$$

in case of the data processed in the file unit while having the value of $$k = \text{BufSize} \times \frac{1}{N}$$

in case of the data processed in the kernel buffer unit.

Next, the segment pattern frequency characteristic value is calculated as follows (S230).

When the number of bits constituting the segment is "n", the segment pattern ($\Delta_a$) that may appear in the segment can be any of a total of $2^n$ patterns including "00 . . . 00", "00 . . . 01", "00 . . . 10", "00 . . . 11", . . . , and "11 . . . 11". Here, a numerical representation of the segment pattern ($\Delta_a$) is denoted by 'a' (i.e., $\Delta_a$=a, where a=0, 1, . . . , $2^{n-1}$).

Then, the number of segment patterns can be obtained by equation 6.

$$\text{initially } \forall a, \lambda_a \leftarrow 0, \quad \text{[Equation 6]}$$
$$\forall i,$$
$$x \leftarrow BUF_i$$
$$\lambda_x \leftarrow \lambda_x + 1$$

Here, i=0, 1, . . . , (k−1), x=0, 1, . . . , $2^{n-1}$, and $BUF_i$=0, 1, . . . , $2^{n-1}$.

The segment pattern frequency characteristic value ($F_a$) is calculated by dividing the number of segment patterns ($\lambda_a$) by the number of segments (k) as shown in equation 7.

$$F_a = \frac{\lambda_a}{k} \quad \text{[Equation 7]}$$

Here, 'a' denotes the numerical representation of the segment pattern ($\Delta_a$), and a=0, 1, . . . , $2^{n-1}$. 'k' denotes the number of segments in the data and has the value of $$k = \text{FileSize} \times \frac{1}{N}$$

in case of the data processed in the file unit while having the value of $$k = \text{BufSize} \times \frac{1}{N}$$

in case of the data processed in the kernel buffer unit.

In the first embodiment of the present disclosure, a threshold for the bit position ratio characteristic value, a threshold for the segment bit number ratio characteristic value, and a threshold for the segment pattern frequency characteristic value can be set as the thresholds for determining the randomness of the at least one characteristic value in the operation S100.

The thresholds for the characteristic values may be set to an equal value, for example, to 90%. However, the thresholds for the characteristic values may be set differently from each other. Further, the thresholds may be adjusted as needed.

Afterwards, the at least one characteristic value extracted from the output subject data is compared with a corresponding threshold, i.e. the threshold for the bit position ratio characteristic value, the threshold for the segment bit ratio characteristic value, or the threshold for the segment pattern frequency characteristic value for determining the randomness of the characteristic values (S125).

For example, if the randomness matching ratio of each bit position ratio characteristic value extracted from the output subject data is greater than a corresponding threshold, it is determined that the bit position ratio characteristic value has the randomness. If the randomness matching ratio of each segment bit number ratio characteristic value extracted from the output subject data is greater than a corresponding threshold, it is determined that the segment bit number ratio characteristic value has the randomness. If the randomness matching ratio of each segment pattern frequency characteristic value extracted from the output subject data is greater than a corresponding threshold, it is determined that the segment pattern frequency characteristic value has the randomness.

Afterwards, it is determined whether the ransomware attack occurred to the output subject data based on a combination of randomness determination results (S130).

For example, if it is determined that more than a predetermined number of characteristic values extracted from the output subject data have the randomness, it can be determined that a ransomware attack occurred in consideration of high randomness revealed in the output subject data.

Finally, the output subject data is output according to the determination result for the ransomware attack (S135, S140, S145).

In detail, if it is determined that there is no ransomware attack in the operation S135, the output subject data is normally output to the auxiliary memory 30 and stored in the auxiliary memory 30 (S140). On the other hand, if it is determined a ransomware attack occurred in the operation S135, a data output operation for the output subject data is canceled so that the data encrypted by the ransomware attack is not stored in the auxiliary memory 30 (S145). Thus, the present disclosure can prevent the data stored in the auxiliary memory 30 from being encrypted and changed by the ransomware attack.

Figure 5:
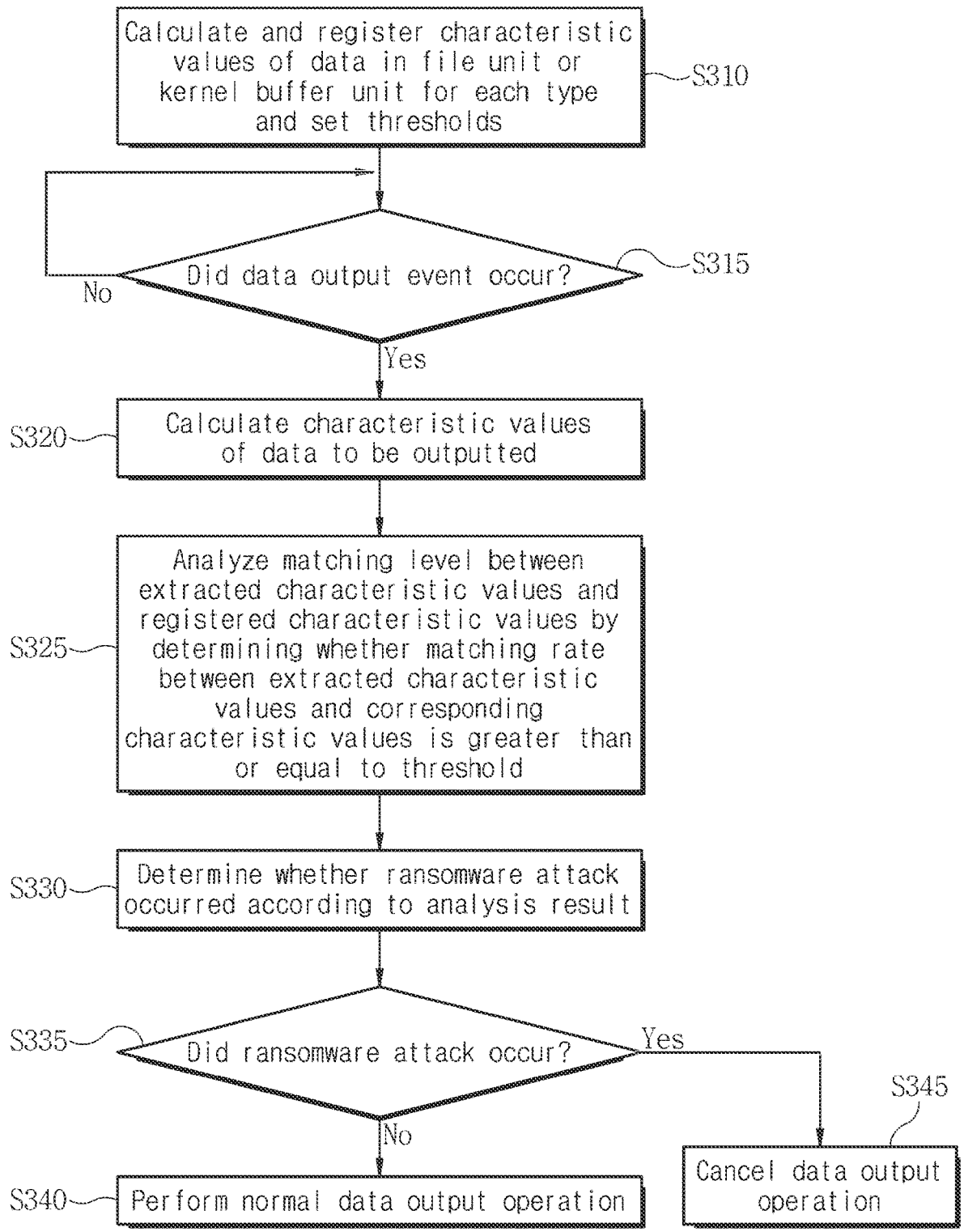
FIG. 5 is a flowchart illustrating a data processing method for coping with ransomware according to a second embodiment of the present disclosure.

FIG. 5 is a flowchart illustrating a data processing method for coping with ransomware according to a second embodiment of the present disclosure.

In the second embodiment of the present disclosure, the ransomware attack is determined based on data characteristic values including the bit position ratio characteristic value, the segment bit number ratio characteristic value, and the segment pattern frequency characteristic value similarly to the first embodiment. According to the second embodiment of the present disclosure, however, reference characteristic values are extracted and registered and the corresponding thresholds for the reference characteristic values are set in advance, and it is determined whether the matching ratio of the characteristic value extracted from the output subject data and the registered characteristic value is greater than or equal to the threshold. In addition, in the second embodiment of the present disclosure, the data can be processed in a file unit or kernel buffer unit.

The second embodiment of the present disclosure will now be described in detail with reference to FIG. 5. First, considering a type of data, one or more characteristic values representing characteristics of the data are selected and registered, and thresholds corresponding to respective characteristic values are set (S310). The characteristic values utilized in the second embodiment of the present disclosure include the bit position ratio characteristic value, the segment bit number ratio characteristic value, and the segment pattern frequency characteristic value described regarding the first embodiment.

However, in the second embodiment of the present disclosure, the characteristic values are calculated and registered for each data type. In order to distinguish from the characteristic values in the first embodiment, the characteristic values in the second embodiment are referred to as a bit position ratio characteristic value for each type, a segment bit number ratio characteristic value for each type, and a segment pattern frequency characteristic value for each type.

Figure 6:
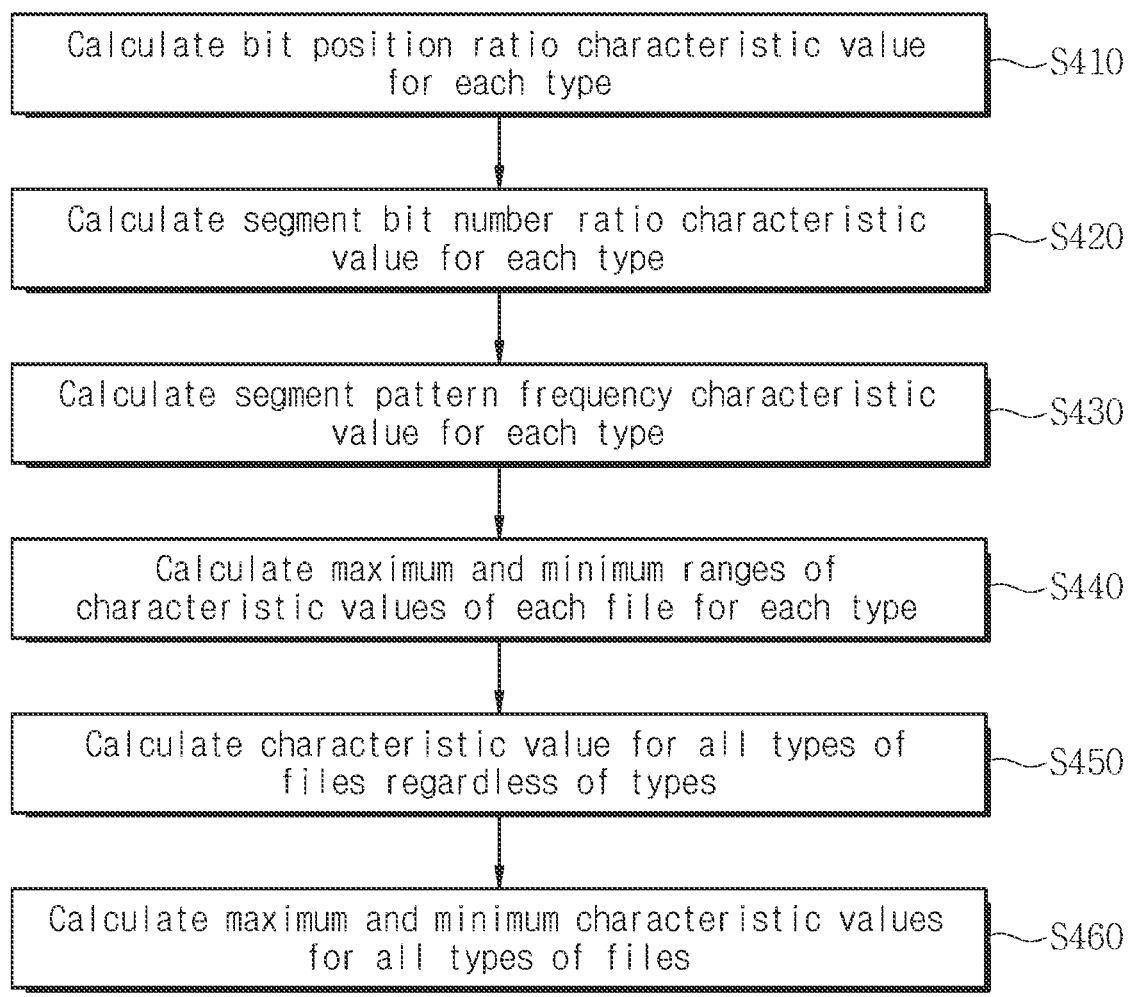
FIG. 6 is a flowchart illustrating a process of extracting data characteristic values in the data processing method for coping with ransomware according to the second embodiment of the present disclosure.

The registering operation S310 will be described in detail with reference to FIG. 6.

First, the data in a normal state which was not subjected to the ransomware attack is collected for each data type, and then the bit position ratio characteristic value for each type, the segment bit number ratio characteristic value for each type, and the segment pattern frequency characteristic value for each type are calculated using the data of each data type (S410, S420, S430).

In addition, in order to determine a matching level of the characteristic values under various conditions, a maximum and minimum range of the bit position ratio characteristic value for each type, a maximum and minimum range of the segment bit number ratio characteristic value for each type, a maximum and minimum range of the segment pattern frequency characteristic value for each type may be further calculated from the data categorized by data types to be registered (S440).

In order to further take into account a case where the data type cannot be distinguished, a bit position ratio characteristic value for all types, a segment bit number ratio characteristic value for all types, and a segment pattern frequency characteristic value for all types are further calculated and registered by applying all the data, regardless of the data types used to calculate the bit position ratio characteristic value for each type, the segment bit number ratio characteristic value for each type, and the segment pattern frequency characteristic value for each type (S450).

Also, the maximum minimum ranges of the bit position ratio characteristic value for all types, the segment bit number ratio characteristic value for all types, and the segment pattern frequency characteristic value for all types may further be calculated and registered (S460).

The registered characteristic values can be calculated by the equations 1 through the equation 7 described above regarding the first embodiment, but differ from the characteristic value described above regarding the first embodiment in data sets used for calculating the characteristic values. That is, the data used for calculating the registered characteristic values in the operation S310 may be gathered for each data type in the normal state where the ransomware attack has not occurred.

Afterwards, it is checked whether a data output event from the processor 10 to the auxiliary memory 30 occurred (S315). In case that a data output event occurred, one or more characteristic values for the output subject data are calculated (S320). The operation S320 may be carried out in a same manner as the operation S120 in the first embodiment. That is, at least one of the bit position ratio characteristic value, the segment bit number ratio characteristic value, and the segment pattern frequency characteristic value is calculated from the output subject data.

Next, each matching level between one or more characteristic values extracted from the output subject data and one or more registered characteristic values are analyzed by determining whether the matching ratio between each of the extracted characteristic values and the corresponding registered characteristic value is greater than or equal to the threshold (S325).

In the operation S325 of analyzing the matching level, the present disclosure may determine 12 kinds of matching levels as follows.

1. Verify whether the bit position ratio characteristic value extracted from the output subject data matches the bit position ratio characteristic value for the type corresponding to the output subject data among the registered characteristic values.

2. Verify whether the segment bit number ratio characteristic value extracted from the output subject data matches the segment bit number ratio characteristic value for the type corresponding to the output subject data among the registered characteristic values.

3. Verify whether the segment pattern frequency characteristic value extracted from the output subject data matches the segment pattern frequency characteristic value for the type corresponding to the output subject data among the registered characteristic values.

4. Verify whether the bit position ratio characteristic value extracted from the output subject data is within the maximum and minimum range of the bit position ratio characteristic value for the type corresponding to the output subject data among the registered characteristic values.

5. Verify whether the segment bit number ratio characteristic value extracted from the output subject data is within the maximum and minimum range of the segment bit number ratio characteristic value for the type corresponding to the output subject data among the registered characteristic values.

6. Verify whether the segment pattern frequency characteristic value extracted from the output subject data is within the maximum and minimum range of the segment pattern frequency characteristic value for the type corresponding to the output subject data among the registered characteristic values.

7. Verify whether the bit position ratio characteristic value extracted from the output subject data matches the bit position ratio characteristic value for all types among the registered characteristic values.

8. Verify whether the segment bit number ratio characteristic value extracted from the output subject data matches the segment bit number ratio characteristic value for all types among the registered characteristic values.

9. Verify whether the segment pattern frequency characteristic value extracted from the output subject data matches the segment pattern frequency characteristic value for all types among the registered characteristic values.

10. Verify whether the bit position ratio characteristic value extracted from the output subject data is within the maximum and minimum range of the bit position ratio characteristic value for all types among the registered characteristic values.

11. Verify whether the segment bit number ratio characteristic value extracted from the output subject data is within the maximum and minimum range of the segment bit number ratio characteristic value for all types among the registered characteristic values.

12. Verify whether the segment pattern frequency characteristic value extracted from the output subject data is within the maximum and minimum range of the segment pattern frequency characteristic value for all types among the registered characteristic values.

Then, it is determined whether the ransomware attack occurred to the output subject data based on a result of the matching level analysis (S330).

For example, it is determined that a ransomware attack occurred on the output subject data when the number of the unsatisfied conditions is greater than or equal to a predetermined number after checking which one of the 12 types of matching level determinations described above is satisfied and finding out the number of the unsatisfied conditions, i.e., the number of conditions for which the extracted characteristic value does not match the corresponding characteristic value.

When the determination as to whether there occurred the ransomware attack is completed, the output operation for the output subject data is carried out according to the determination result for the ransomware attack (S335, S340, S345).

In detail, if it is determined that there is no ransomware attack in the operation S335, the output subject data is normally output to the auxiliary memory 30 and stored in the auxiliary memory 30 (S340). On the other hand, if it is determined that a ransomware attack occurred in the operation S335, a data output operation for the output subject data is canceled so that the data encrypted by the ransomware attack is not stored in the auxiliary memory 30 (S345).

Through this process, the present disclosure can prevent the data stored in the auxiliary memory 30 from being encrypted and changed by the ransomware attack.

While the present specification contains a number of specific implementation details, it should be understood that they are not to be construed as limitations on the scope of any disclosure or claims, but as a description of features that may be specific to a particular embodiment of a particular disclosure. Certain features described with respect to contexts of independent embodiments may be implemented in combination in a single embodiment. Conversely, various features described in the context of a single embodiment may also be implemented in other embodiments either individually or in any suitable sub-combination. Further, although some features may be described to operate in a particular combination and may be initially depicted as so claimed, one or more features from the claimed combination may in some cases be excluded from the combination, and a claimed combination may be replaced by a sub-combination or a variant of the sub-combination.

Similarly, although the operations are depicted in the drawings in a particular order, it should not be understood that such operations need to be performed in that particular order or sequential order shown to achieve the desired result or all the depicted operations should be performed. In certain cases, multitasking and parallel processing may be advantageous. Also, the fragmentation of the various system components in the above-described embodiments should not be understood as requiring such fragmentation in all embodiments, and the program components and systems described above may generally be integrated together into a single software product or packaged into a multiple-function software product.

Although specific embodiments of the subject matter have been described herein, other embodiments are within the scope of the following claims. For example, the operations defined in the claims may be performed in a different order to still achieve desirable results. By way of example, the process illustrated in the accompanied drawings does not necessarily require that particularly illustrated sequence or sequential order to achieve the desired result. In certain implementations, multitasking and parallel processing may be advantageous.

The descriptions set forth above disclose the best mode of the present disclosure, and is provided to illustrate the disclosure and to enable those skilled in the art to make and use the disclosure. The written description is not intended to limit the disclosure to the specific terminology presented. Thus, although the present disclosure has been described in detail with reference to the above examples, those skilled in the art will be able to make adaptations, modifications, and variations on the examples without departing from the scope of the present disclosure.

Therefore, the scope of the present disclosure should not be limited by the described embodiments but be defined by the appended claims. The description of the disclosure is merely exemplary in nature and, thus, variations that do not depart from the substance of the disclosure are intended to be within the scope of the disclosure. Such variations are not to be regarded as a departure from the spirit and scope of the disclosure.

The method of the present disclosure is applicable in a computer apparatus that loads an application program stored in a memory onto a processor and carries out a predetermined processing according to the application program. On a level of an operating system (OS) kernel which controls an access of the application program to hardware components of the computer apparatus, the processor reads the data stored in the memory, performs the predetermined processing at the request of the application program, determines whether a ransomware attack occurred for the data before storing the processed data back to the memory, and, according to a determination result, stores the processed data to the memory. Thus, the present disclosure may prevent the damage caused by the ransomware attack.

In other words, the present disclosure prevents the data infected by the ransomware from being stored into the memory and protect the data by determining whether a ransomware attacked occurred on the data processed by the processor according to a request of an application program before the processed data is stored back into the memory.

Particularly, according to the present disclosure, the output subject data to be stored back into the memory is divided into a plurality of segments each having a predetermined size, and characteristic values such as a bit position ratio and a pattern appearing in the data are extracted. The ransomware attack is detected based on the randomness existing in the output subject data after the ransomware attack, or by a matching level analysis which compares characteristic values extracted from the data for each data type with registered characteristic values. As a result, the present disclosure can filter out ransomware attacks that have not been detected in advance.

The invention claimed is:

1. A data processing method for coping with ransomware in a computer apparatus having a processor and a memory, comprising:

registering at least one characteristic value selected in consideration of a type of data;

when output subject data to be outputted from the processor to the memory is generated, dividing the output subject data into a plurality of segments each having a predetermined size, and extracting the at least one characteristic value for the output subject data by analyzing the plurality of segments;

analyzing a matching level of each of the at least one characteristic value by comparing the at least one characteristic value extracted from the output subject data with a corresponding registered characteristic value;

determining whether an ransomware attack occurred to the output subject data according to a matching level analysis result; and executing an output operation for the output subject data according to a ransomware attack determination result, wherein the at least one characteristic value comprises a bit position ratio characteristic value that represents a statistical value for a ratio at which a predetermined bit value appears at each bit position in the plurality of segments or a segment bit number ratio characteristic value that represents a statistical value for a number of bits having a particular bit value in the plurality of segments, wherein the at least one characteristic value for the output subject data further comprises a segment pattern frequency characteristic value that represents a statistical value for each frequency of occurrences of different segment patterns appearing in the plurality of segments, and wherein registering the at least one characteristic value comprises:

registering at least one of: a bit position ratio characteristic value for each type extracted from data categorized by data types and a maximum and minimum range thereof, a segment bit number ratio characteristic value for each type extracted from the data categorized by data types and a maximum and minimum range thereof, a segment pattern frequency characteristic value for each type extracted from the data categorized by data types and a maximum and minimum range thereof, a bit position ratio characteristic value for all types extracted from all types of data regardless of the data types and a maximum and minimum range thereof, a segment bit number ratio characteristic value for all types extracted from all the types of data regardless of the data types and a maximum and minimum range thereof, and a segment pattern frequency characteristic value for all types extracted from all the types of data regardless of the data types and a maximum and minimum range thereof.

2. The data processing method of claim 1, wherein analyzing the matching level comprises at least one of:

verifying whether the bit position ratio characteristic value extracted from the output subject data matches the bit position ratio characteristic value for a type corresponding to the output subject data among the registered characteristic values;

verifying whether the segment bit number ratio characteristic value extracted from the output subject data matches the segment bit number ratio characteristic value for the type corresponding to the output subject data among the registered characteristic values;

verifying whether the segment pattern frequency characteristic value extracted from the output subject data matches the segment pattern frequency characteristic value for the type corresponding to the output subject data among the registered characteristic values;

verifying whether the bit position ratio characteristic value extracted from the output subject data is within the maximum and minimum range of the bit position ratio characteristic value for the type corresponding to the output subject data among the registered characteristic values;

verifying whether the segment bit number ratio characteristic value extracted from the output subject data is within the maximum and minimum range of the segment bit number ratio characteristic value for the type corresponding to the output subject data among the registered characteristic values;

verifying whether the segment pattern frequency characteristic value extracted from the output subject data is within the maximum and minimum range of the segment pattern frequency characteristic value for the type corresponding to the output subject data among the registered characteristic values;

verifying whether the bit position ratio characteristic value extracted from the output subject data matches the bit position ratio characteristic value for all types among the registered characteristic values;

verifying whether the segment bit number ratio characteristic value extracted from the output subject data matches the segment bit number ratio characteristic value for all types among the registered characteristic values;

verifying whether the segment pattern frequency characteristic value extracted from the output subject data matches the segment pattern frequency characteristic value for all types among the registered characteristic values;

verifying whether the bit position ratio characteristic value extracted from the output subject data is within the maximum and minimum range of the bit position ratio characteristic value for all types among the registered characteristic values;

verifying whether the segment bit number ratio characteristic value extracted from the output subject data is within the maximum and minimum range of the segment bit number ratio characteristic value for all types among the registered characteristic values; and verifying whether the segment pattern frequency characteristic value extracted from the output subject data is within the maximum and minimum range of the segment pattern frequency characteristic value for all types among the registered characteristic values.

3. The data processing method of claim 2, wherein registering the at least one characteristic value comprises:

setting a threshold for each of the registered characteristic values, wherein analyzing the matching level comprises:

analyzing whether a matching ratio between at least one of the characteristic values extracted from the output subject data and the registered characteristic values corresponding to the extracted characteristic values is greater than or equal to a corresponding threshold.

4. The data processing method of claim 2, wherein determining whether the ransomware attack occurred comprises:

determining that the ransomware attack occurred to the output subject data in case that the number of verification operations, among a plurality of verification operations, that are not satisfied is greater than or equal to a predetermined number.

5. The data processing method of claim 1, wherein the output subject data is processed in a file unit or a kernel buffer unit.

* * * * *